(12) United States Patent
Seiler et al.

(10) Patent No.: US 11,170,577 B2
(45) Date of Patent: Nov. 9, 2021

(54) GENERATING AND MODIFYING REPRESENTATIONS OF OBJECTS IN AN AUGMENTED-REALITY OR VIRTUAL-REALITY SCENE

(71) Applicant: Facebook Technologies, LLC, Menlo Park, CA (US)

(72) Inventors: Larry Seiler, Redmond, WA (US); Alex Nankervis, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/586,590

(22) Filed: Sep. 27, 2019

(65) Prior Publication Data

US 2020/0134923 A1 Apr. 30, 2020

Related U.S. Application Data

(60) Provisional application No. 62/753,035, filed on Oct. 30, 2018.

(51) Int. Cl.
*G06T 19/00* (2011.01)
*G06K 9/00* (2006.01)
*G06F 3/01* (2006.01)

(52) U.S. Cl.
CPC ............ *G06T 19/006* (2013.01); *G06F 3/011* (2013.01); *G06K 9/00201* (2013.01); *G06K 9/00711* (2013.01)

(58) Field of Classification Search
None
See application file for complete search history.

(56) References Cited

U.S. PATENT DOCUMENTS

| 2012/0194517 | A1* | 8/2012 | Izadi | G06T 7/20 |
| | | | | 345/420 |
| 2014/0063016 | A1* | 3/2014 | Howson | G06T 15/005 |
| | | | | 345/426 |
| 2017/0018121 | A1* | 1/2017 | Lawson | G06T 17/00 |
| 2017/0115488 | A1* | 4/2017 | Ambrus | G06T 11/60 |
| 2017/0155885 | A1* | 6/2017 | Selstad | G06T 3/00 |

(Continued)

OTHER PUBLICATIONS

S. Widmer, D. Pajak, A. Schulz, K. Pulli, J. Kautz, M. Goesele, D. Luebke, "An Adaptive Acceleration Structure for Screen-space Ray Tracing", Aug. 9, 2015, ACM, High Performance Graphics 2015, pp. 67-76.*

(Continued)

*Primary Examiner* — Robert Bader
(74) *Attorney, Agent, or Firm* — Baker Botts L.L.P.

(57) ABSTRACT

In one embodiment, a method for generating subframes may include accessing a rendered frame depicting a virtual scene from a first viewpoint of a user. The rendered frame may be generated based on at least one 3D model of an object in the virtual scene. A computing system may generate plurality of surfaces based on the rendered frame. Each surface may be positioned within a 3D space and comprises visual information. The system may determine a second viewpoint of the user in the 3D space and determine a visibility of the plurality of surfaces from the second viewpoint. The system may then render a subframe depicting the virtual scene from the second viewpoint based on the visual information and determined visibility of the plurality of surfaces.

19 Claims, 17 Drawing Sheets

(56) References Cited

U.S. PATENT DOCUMENTS

| | | | |
|---|---|---|---|
| 2017/0169602 A1* | 6/2017 | Blackmon | G06T 15/005 |
| 2017/0374341 A1* | 12/2017 | Michail | G06T 15/06 |
| 2018/0081429 A1* | 3/2018 | Akenine-Moller | G06F 3/012 |
| 2018/0253868 A1* | 9/2018 | Bratt | G06F 3/012 |
| 2018/0357749 A1* | 12/2018 | Young | G06T 3/40 |

OTHER PUBLICATIONS

Jonathan Shade, Steven Gortler, Li-wei He, Richard Szeliski, "Layered Depth Images", Jul. 1998, ACM, SIGGRAPH '98: Proceedings of the 25th annual conference on Computer graphics and interactive techniques, pp. 231-242.*

Bogumil Bartczak, Patrick Vandewalle, Oliver Grau, Gérard Briand, Jérôme Fournier, Paul Kerbiriou, Michael Murdoch, Marcus Müller, Rocco Goris, et al. "Display-Independent 3D-TV Production and Delivery Using the Layered Depth Video Format", Jun. 2011, IEEE, IEEE Transactions on Broadcasting, vol. 57, #2, pp. 477-490.*

Robert L. Cook, Thomas Porter, Loren Carpenter, "Distributed Ray Tracing", Jul. 1984, ACM, Computer Graphics, vol. 18, No. 3, pp. 137-145.*

Bernhard Reinert, Johannes Kopf, Tobias Ritschel, Eduardo Cuervo, David Chu, Hans-Peter Seidel, "Proxy-guided Image-based Rendering for Mobile Devices", 2016, Wiley, Computer Graphics Forum, vol. 35, No. 7, pp. 353-362.*

Johannes Ghiletiuc, Markus Färber, Beat Brüderlin, "Real-time Remote Rendering of Large 3D Models on Smartphones using Multi-layered Impostors", Jun. 7, 2013, ACM, Mirage '13: Proceedings of the 6th International Conference on Computer Vision/Computer Graphics Collaboration Techniques and Applications, article 14.*

W. Pasman, F. W. Jansen, "Distributed Low-latency Rendering for Mobile AR", Oct. 30, 2001, IEEE, Proceedings IEEE and ACM International Symposium on Augmented Reality 2001, pp. 107-113.*

Lionel Baboud, Xavier Decoret, "Rendering Geometry with Relief Textures", Jun. 2006, ACM, GI '06: Proceedings of Graphics Interface 2006, pp. 195-201.*

Solomon Boulos, Dave Edwards, J. Dylan Lacewell, Joe Kniss, Jan Kautz, Peter Shirley, Ingo Wald, "Packet-based Whitted and Distribution Ray Tracing", May 30, 2007, ACM, GI '07: Proceedings of Graphics Interface 2007, pp. 177-184.*

Daniel Pohl, Gregory S. Johnson, Timo Bolkart, "Improved Pre-Warping for Wide Angle, Head Mounted Displays", Oct. 9, 2013, ACM, VRST '13: Proceedings of the 19th ACM Symposium on Virtual Reality Software and Technology, pp. 259-262.*

Daniel Cohen, Amit Shaked, "Photo-Realistic Imaging of Digital Terrains", Aug. 1993, Eurographics, Computer Graphics Forum, vol. 12, No. 3, pp. 363-373.*

International Search Report and Written Opinion for International Application No. PCT/US2019/058267, dated Dec. 13, 2019.

Reinert et al., Proxy-guided Image-based Rendering for Mobile Devices, Computer Graphics Forum, 35(7):1-10, 2016.

Shi et al., A Survey of Interactive Remote Rendering Systems, ACM Computer Surveys, ACM, Article 57, 47(4):1-29, May 2015.

https://uploadvr.com/reprojection-explained/, Jan. 17, 2019.

Carmack J. Latency mitigation strategies. Twenty Milliseconds https://danluu.com/latency-mitigation/, Feb. 2013.

* cited by examiner

US 11,170,577 B2

GENERATING AND MODIFYING REPRESENTATIONS OF OBJECTS IN AN AUGMENTED-REALITY OR VIRTUAL-REALITY SCENE

PRIORITY

This application claims the benefit, under 35 U.S.C. § 119(e), of U.S. Provisional Patent Application No. 62/753,035 filed 30 Oct. 2018, which is incorporated herein by reference.

TECHNICAL FIELD

This disclosure generally relates to augmented-reality, virtual-reality, mixed-reality, or hybrid-reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Since its existence, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their heads around when viewing a scene and the environment may need to respond immediately by adjusting the view presented to the user. Each head movement may slightly change the user's perspective of the scene. These head movements may be small but sporadic and difficult (if not impossible) to predict. A problem to be solved is that the head movements may occur quickly, requiring that the view of the scene be modified rapidly to account for changes in perspective that occur with the head movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every 1/60th of a second). As a result, it may not be feasible to modify the scene by re-rendering the entire scene to account for changes in perspective at a pace that is rapid enough (e.g., 200 Hz, once every 1/200th of a second) to prevent the user from perceiving latency and to thereby avoid or sufficiently reduce sensory dissonance.

One solution involves generating and working with "surfaces" that represent objects within the scene, where a surface corresponds to one or more objects that are expected to move/translate, skew, scale, distort, or otherwise change in appearance together, as one unit, as a result of a change in perspective. Instead of re-rendering the entire view, a computing system may simply resample these surfaces from the changed perspective to approximate how a corresponding object would look from the changed perspective. This method may essentially be an efficient shortcut, and may significantly reduce the processing that is required and thus ensure that the view is updated quickly enough to sufficiently reduce latency. Resampling surfaces, unlike re-rendering entire views, may be efficient enough that it can be used to modify views within the allotted time—e.g., in 1/200th of a second—with the relatively limited processing power of a computing system of a HMD. The time scales involved in this modification are so small that it may be unfeasible to have a more powerful system that is physically separated from the HMD (e.g., a separate laptop or wearable device) perform the modification, because the HMD would have to transmit information about the current position and orientation of the HMD, wait for the separate system to render the new view, and then receive the new view from the separate system. By simply resampling surfaces, the modification may be performed entirely on the HMD, thus speeding up the process. Although this disclosure uses particular time periods (1/60th of a second, 1/200th of a second) and corresponding particular frame rates (60 Hz, 200 Hz), these time periods and frame rates are used merely as examples to illustrate the invention, and the disclosure contemplates any other suitable time periods and frame rates.

In particular embodiments, graphics applications (e.g., games, maps, content-providing apps, etc.) may build a scene graph, which is used together with a given view position and point in time to generate primitives to render on a GPU. The scene graph may define the logical and/or spatial relationship between objects in the scene. In particular embodiments, a display engine may also generate and store a scene graph that is a simplified form of the full application scene graph. The simplified scene graph may be used to specify the logical and/or spatial relationships between surfaces (e.g., the primitives rendered by display engine, such as quadrilaterals or contours, defined in 3D space, that have corresponding textures generated based on the mainframe rendered by the application). Storing a scene graph allows display engine to render the scene to multiple display frames, adjusting each element in the scene graph for the current viewpoint (e.g., head position), the current object positions (e.g., they could be moving relative to each other) and other factors that change per display frame. In addition, based on the scene graph, display engine may also adjust for the geometric and color distortion introduced by the display subsystem and then composite the objects together to generate a frame. Storing a scene graph allows display engine to approximate the result of doing a full render at the desired high frame rate, while actually running the GPU at a significantly lower rate.

Embodiments of the invention may include or be implemented in conjunction with an artificial reality system. In particular embodiments, the processing tasks involved in rendering a scene and generating and modifying its surfaces may be split among two or more computing systems. As an example and not by way of limitation, a view of a scene may initially be rendered by a first computing system (e.g., a laptop, a cellphone, a desktop, a wearable device). The rendered results may be used to generate one or more surfaces for the view. In addition to color and transparency information, the surfaces may include information about their location in the scene. These surfaces may be passed to a second computing system (e.g., an onboard computing system on a head-mounted display (HMD)). The HMD may render the objects corresponding to the surfaces within the view based on the information associated with the surfaces and based on a current perspective of the user wearing the HMD (e.g., as determined by the position and orientation of the HMD). Any changes in perspective (e.g., slight head motions of the user that occur on the order of a hundredth of a second) may be tracked by sensors on the HMD and accounted for by the HMD by resampling the surfaces in a view from an adjusted viewpoint. Due to the adjustment of the viewpoint, the surfaces may be translated/moved, skewed, scaled, distorted, or otherwise changed in appearance when they are resampled. Since the scene is not being re-rendered from scratch (e.g., from polygons) and instead just by adjusting surfaces, the scene can be modified relatively quickly (e.g., at 200 Hz). In particular embodiments, the first computing system may be relatively powerful when compared to the second computing system, because the second computing system (e.g., a HMD) may have limited system resources that may not appreciably be increased without resulting in too much weight, size, and/or heat for the user's comfort.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
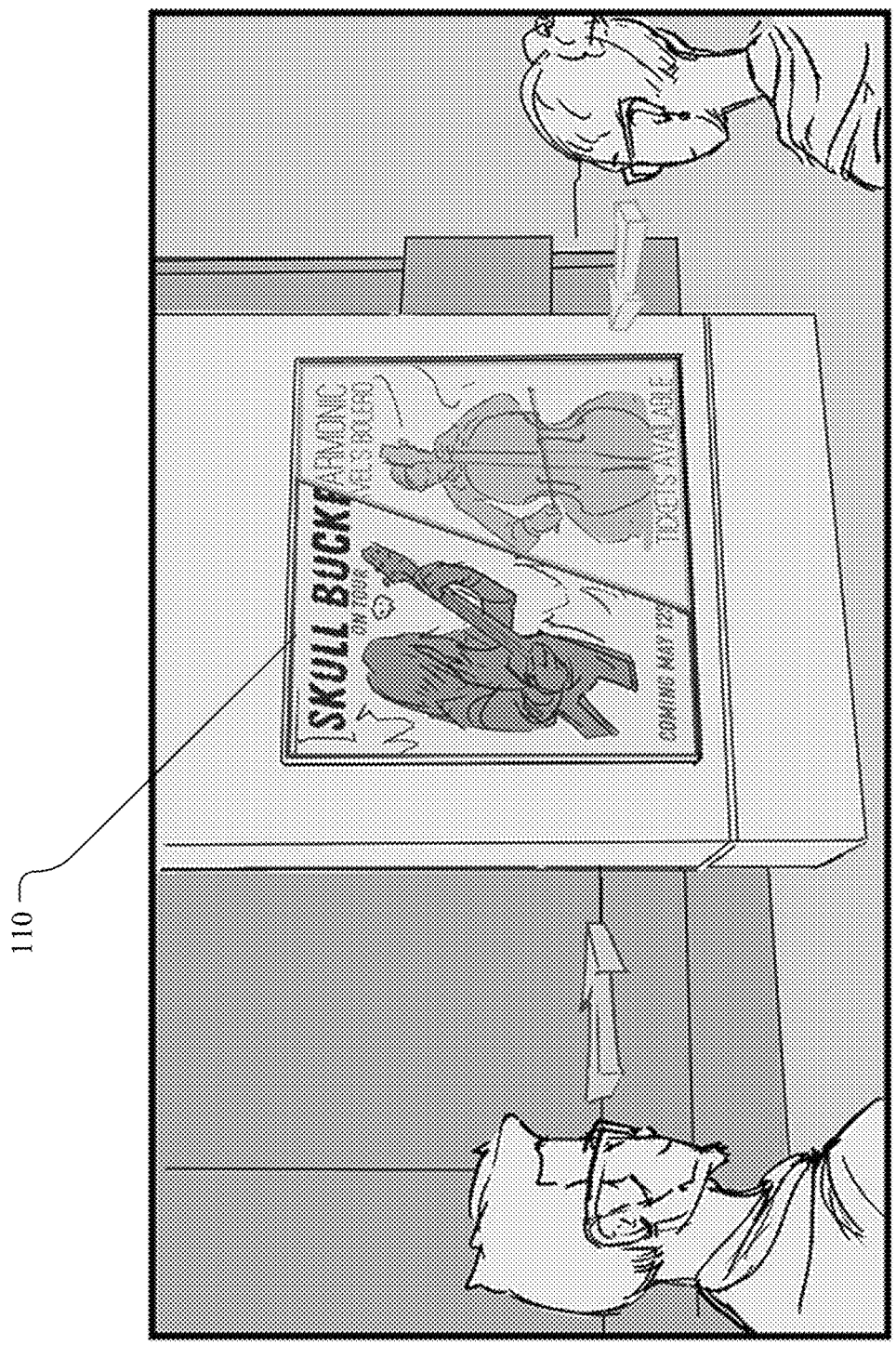
FIGS. 1A-1I illustrate examples of scenes that include objects that may be represented by surfaces.
Figure 1B:
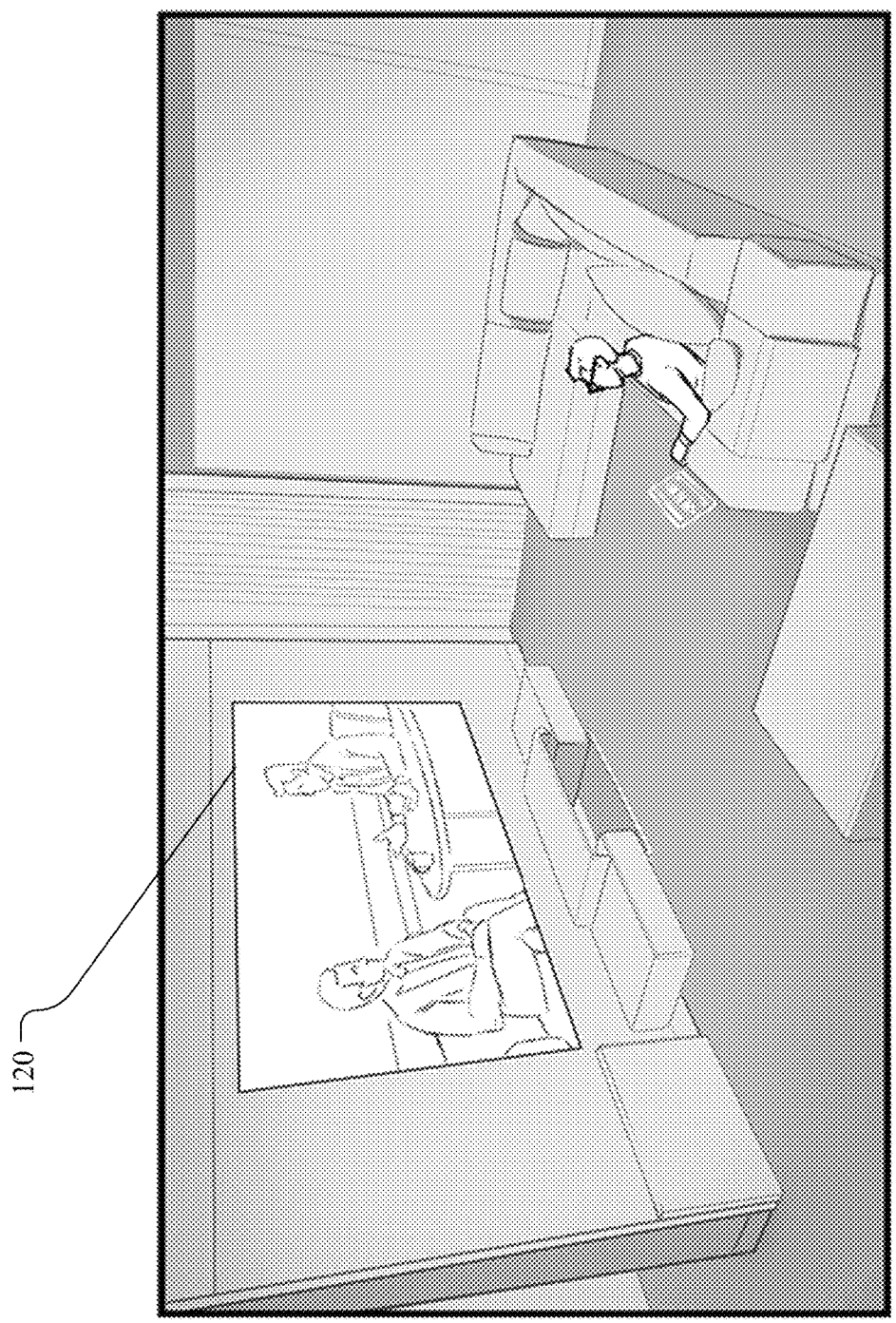
Figure 1C:
Figure 1D:
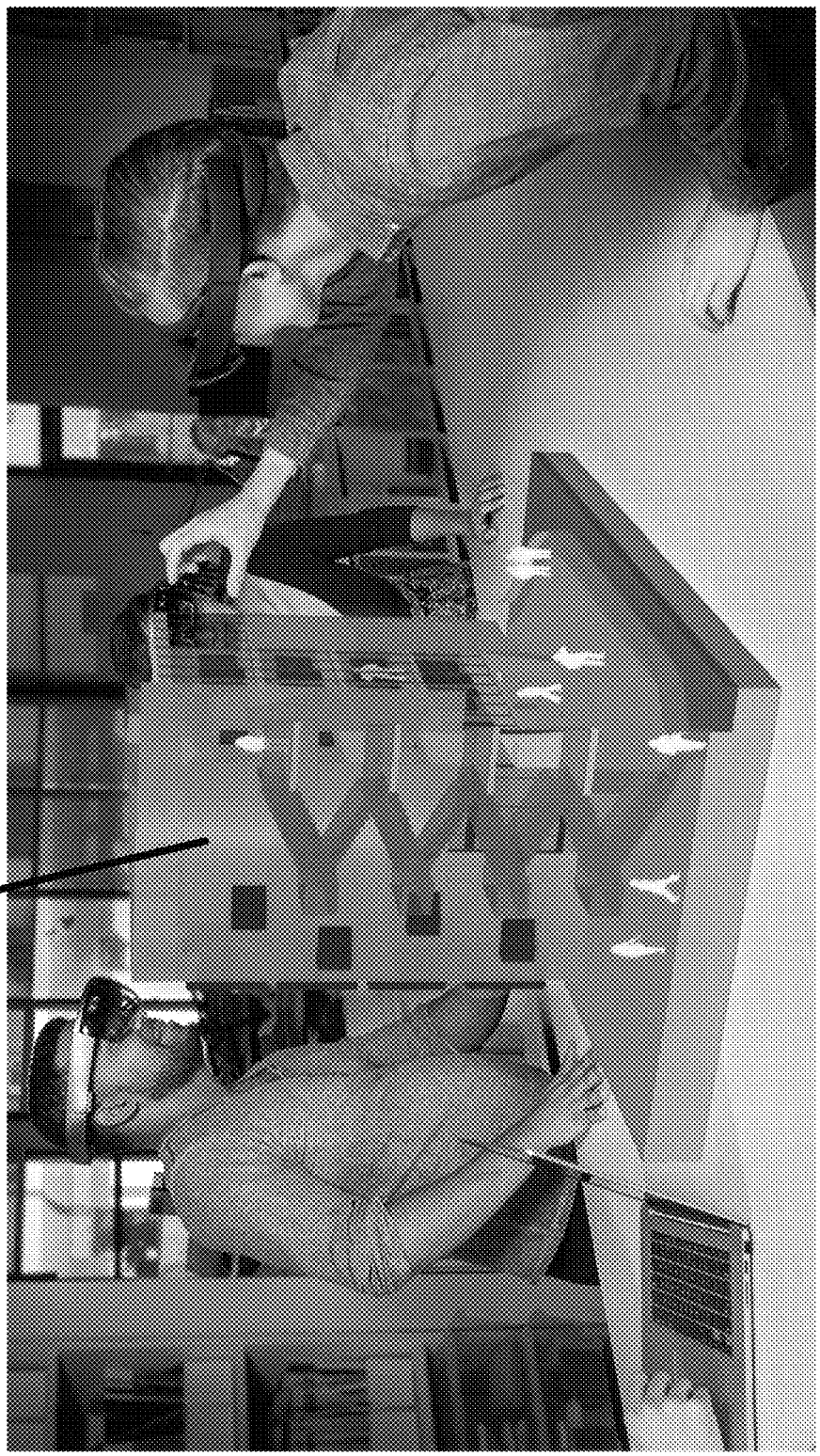
Figure 1E:
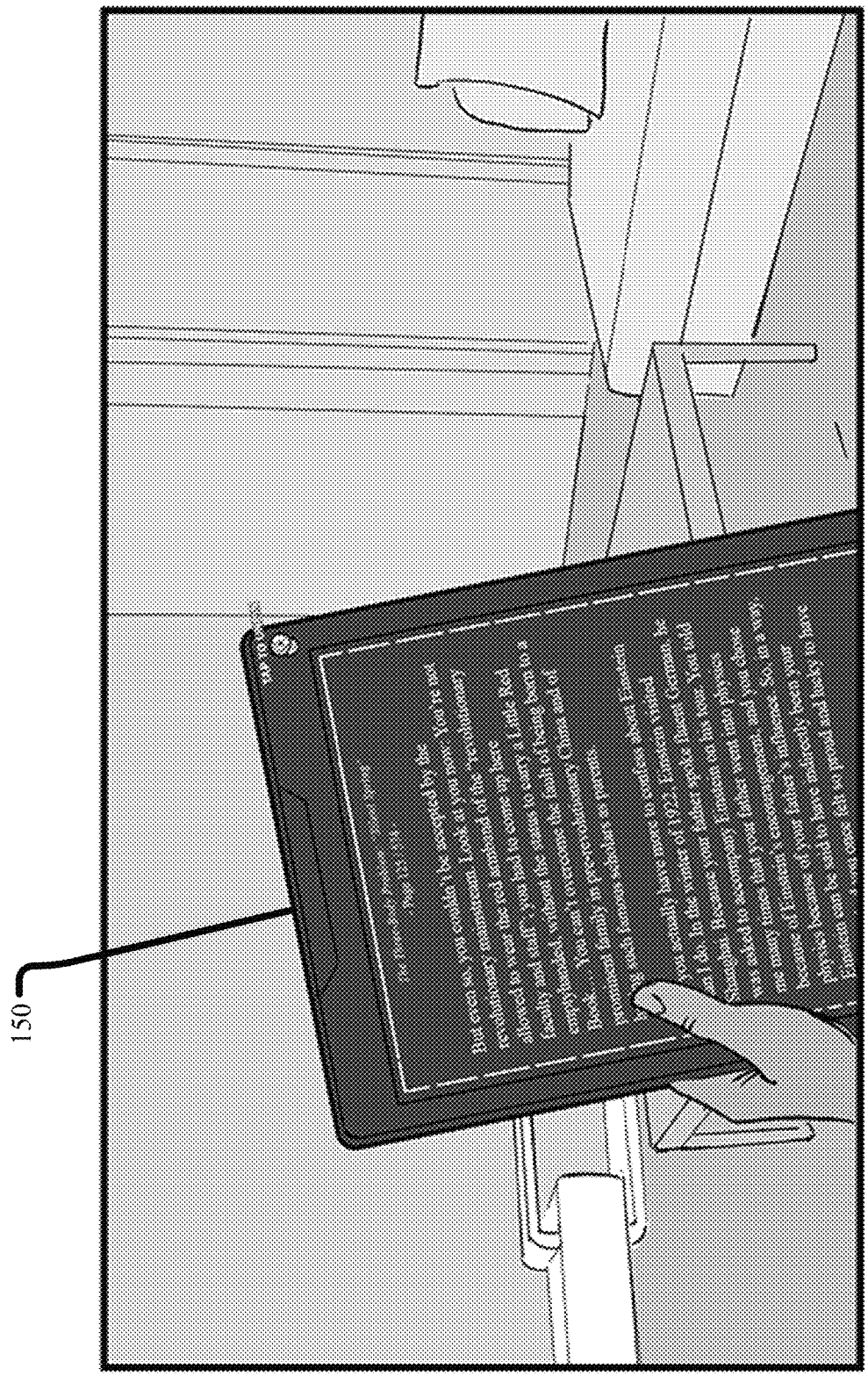
Figure 1F:
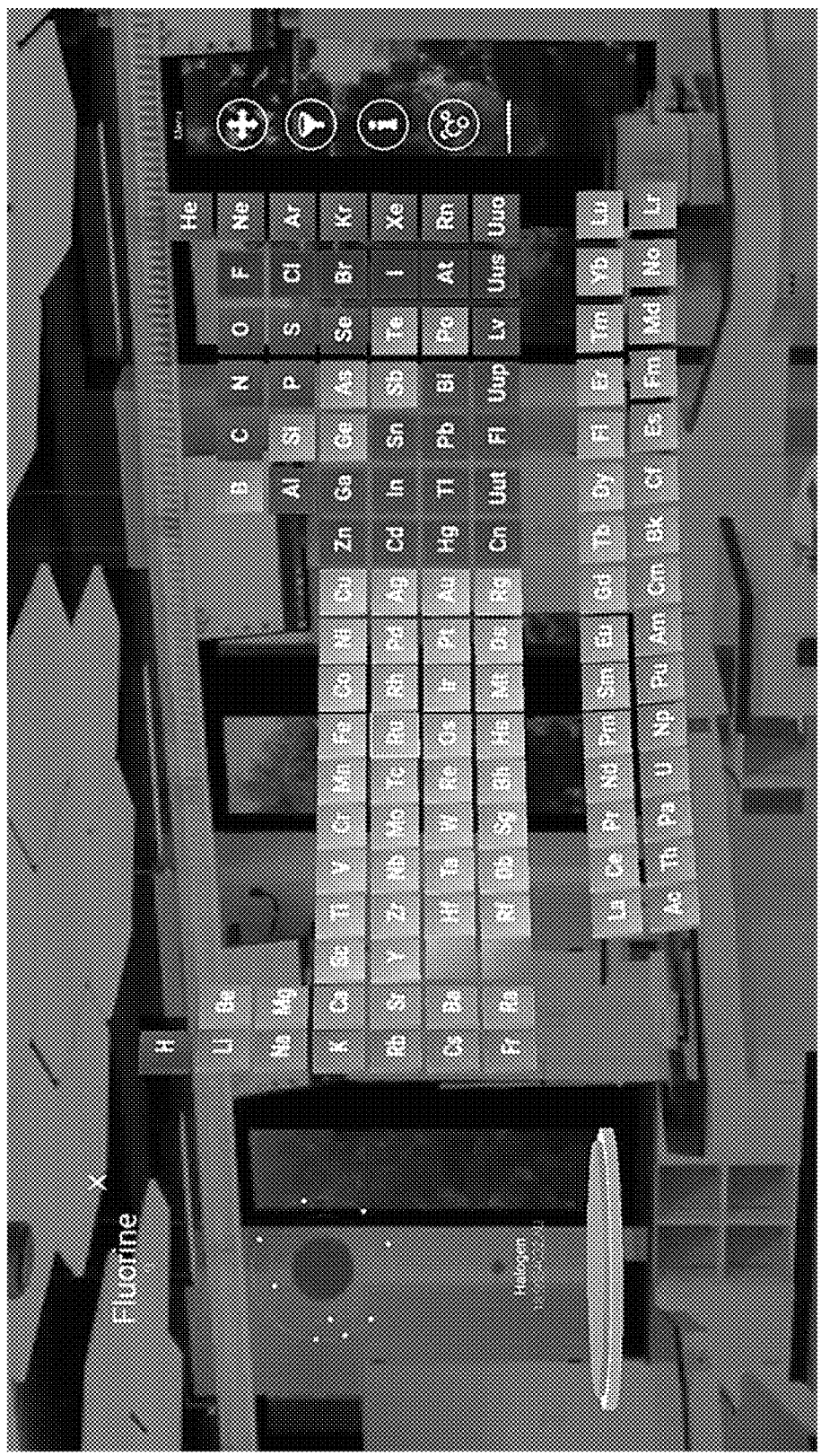
Figure 1G:
Figure 1H:
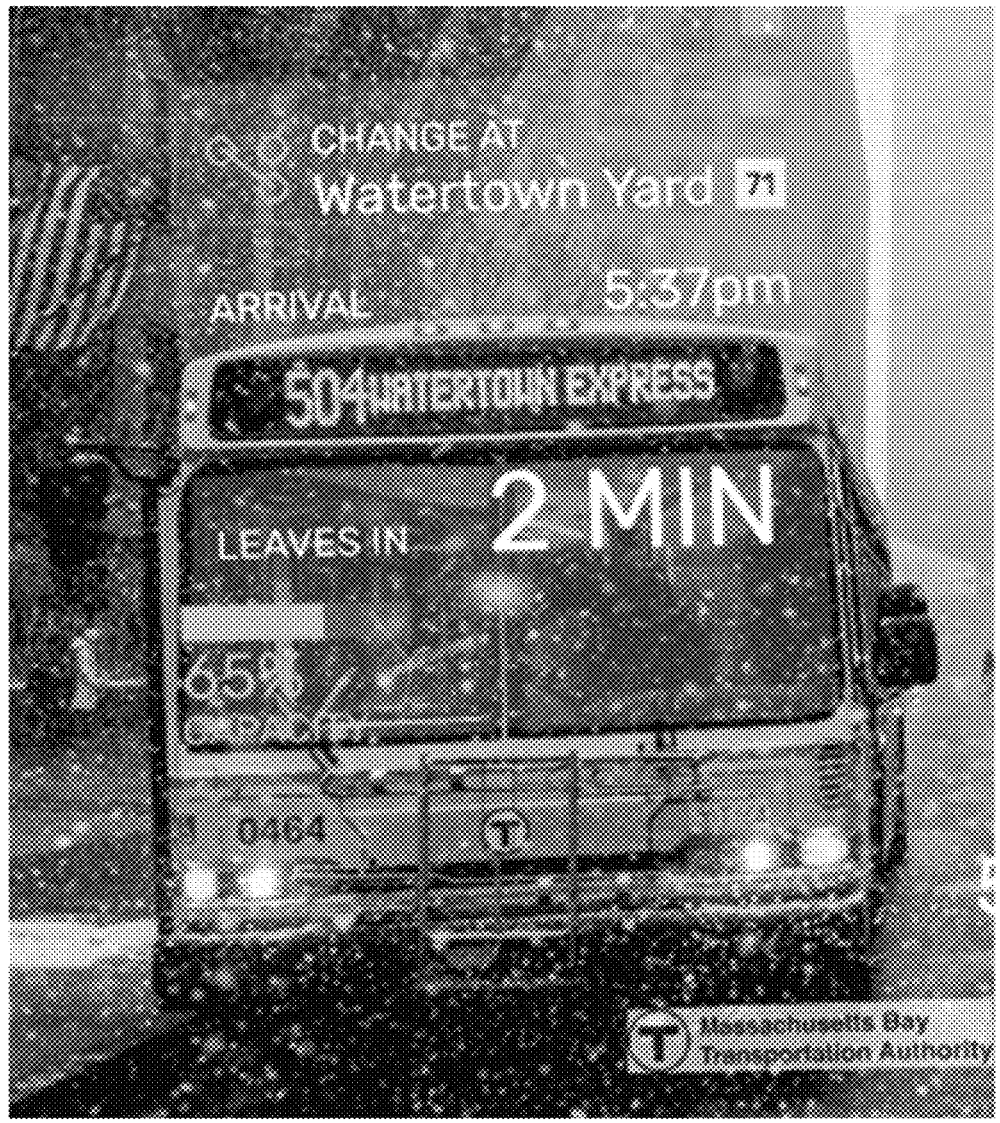
Figure 1I:
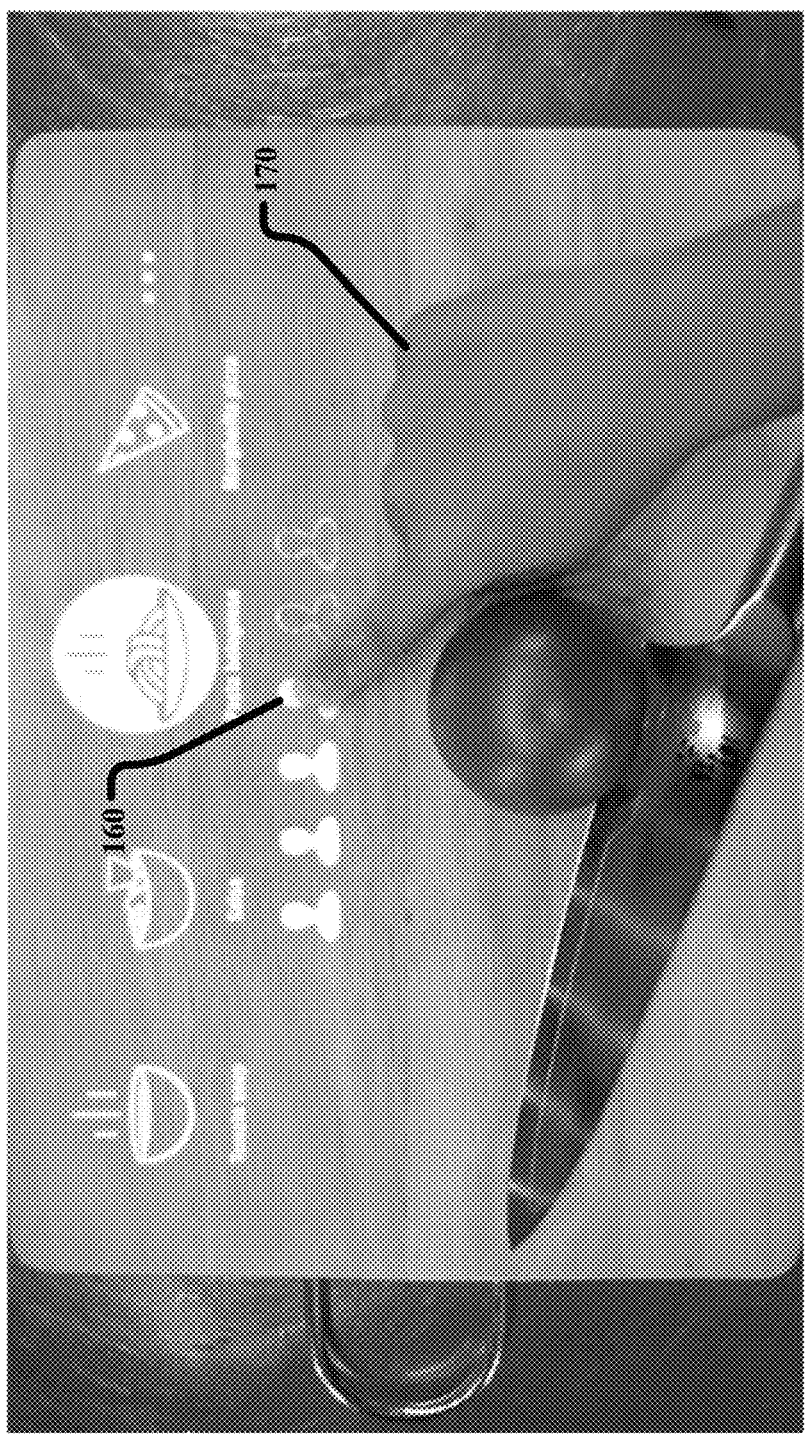

Since its existence, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their heads around when viewing a scene and the environment may need to respond immediately by adjusting the view presented to the user. Each head movement may slightly change the user's perspective of the scene. These head movements may be small but sporadic and difficult (if not impossible) to predict. A problem to be solved is that the head movements may occur quickly, requiring that the view of the scene be modified rapidly to account for changes in perspective that occur with the head movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every ⅙₀th of a second). As a result, it may not be feasible to modify the scene by re-rendering the entire scene to account for changes in perspective at a pace that is rapid enough (e.g., 200 Hz, once every ¹⁄₂₀₀th of a second) to prevent the user from perceiving latency and to thereby avoid or sufficiently reduce sensory dissonance. One solution involves generating and working with "surfaces" that represent a particular view of an objects within the scene, where a surface corresponds to one or more objects that are expected to move/translate, skew, scale, distort, or otherwise change in appearance together, as one unit, as a result of a change in perspective. Instead of re-rendering the entire view, a computing system may simply resample these surfaces from the changed perspective to approximate how a corresponding object would look from the changed perspective. This method may essentially be an efficient shortcut, and may significantly reduce the processing that is required and thus ensure that the view is updated quickly enough to sufficiently reduce latency. Resampling surfaces, unlike re-rendering entire views, may be efficient enough that it can be used to modify views within the allotted time—e.g., in ¹⁄₂₀₀th of a second—with the relatively limited processing power of a computing system of a HMD. The time scales involved in this modification are so small that it may be unfeasible to have a more powerful system that is physically separated from the HMD (e.g., a separate laptop or wearable device) perform the modification, because the HMD would have to transmit information about the current position and orientation of the HMD, wait for the separate system to render the new view, and then receive the new view from the separate system. By simply resampling surfaces, the modification may be performed entirely on the HMD, thus speeding up the process.

Embodiments of the invention may include or be implemented in conjunction with an artificial reality system. In particular embodiments, the processing tasks involved in rendering a scene and generating and modifying its surfaces may be split among two or more computing systems. As an example and not by way of limitation, a view of a scene may initially be rendered by a first computing system (e.g., a laptop, a cellphone, a desktop, a wearable device). The rendered results may be used to generate one or more surfaces for the view. In addition to color and transparency information, the surfaces may include information about their location in the scene. These surfaces may be passed to a second computing system (e.g., an onboard computing system on a head-mounted display (HMD)). The HMD may warp the surfaces within the view based on the information associated with the surfaces and based on a current perspective of the user wearing the HMD (e.g., as determined by the position and orientation of the HMD). Any changes in perspective (e.g., slight head motions of the user that occur on the order of a hundredth of a second) may be tracked by sensors on the HMD and accounted for by the HMD by resampling the surfaces in a view from an adjusted viewpoint. Due to the adjustment of the viewpoint, the surfaces may be translated/moved, skewed, scaled, distorted, or otherwise changed in appearance when they are resampled. Since the scene is not being re-rendered from scratch (e.g., from polygons) and instead just by adjusting surfaces, the scene can be modified relatively quickly (e.g., at 200 Hz). In particular embodiments, the first computing system may be relatively powerful when compared to the second computing system, because the second computing system (e.g., a HMD) may have limited system resources that may not appreciably be increased without resulting in too much weight, size, and/or heat for the user's comfort.

In particular embodiments, a computing system may render an initial view of a scene for display to a user. As an example and not by way of limitation, this initial view may be a view of an AR scene including a set of AR objects (or, as discussed elsewhere herein, a VR scene with VR objects). In particular embodiments, the display may be on a HMD. A HMD may have limited system resources and a limited power supply, and these limitations may not be appreciably reduced without resulting in too much weight, size, and/or heat for the user's comfort. As a result, it may not be feasible for the HMD to unilaterally handle all the processing tasks involved in rendering a view. In particular embodiments, a relatively powerful computing system (e.g., a laptop, a cellphone, a desktop, a wearable device) may be used to render the initial view. In particular embodiments, this computing system may be a device that is in communication with a computing system on the HMD but may be otherwise physically separated from the HMD. As an example and not by way of limitation, the computing system may be a laptop device that is wired to the HMD or communicates wirelessly with the HMD. As another example and not by way of limitation, the computing system may be a wearable (e.g., a device strapped to a wrist), handheld device (e.g., a phone), or some other suitable device (e.g., a laptop, a tablet, a desktop) that is wired to the HMD or communicates wirelessly with the HMD. The computing system may send this initial scene to the HMD for display. Although this disclosure focuses on displaying a scene to a user on a HMD, it contemplates displaying the scene to a user on any other suitable device.

Rendering a view is a resource-intensive task that may involve performing a large number of "visibility tests" against each polygon of an object. In a traditional model of rendering a view of a scene, each object in the scene may be represented by hundreds/thousands of polygons. A computing system rendering the view would need to perform visibility tests against each polygon from each pixel to determine visual information (e.g., color and transparency information) associated with each visible polygon. Visibility testing may be conceptualized as casting one or more imaginary rays through each pixel at the scene from a particular viewpoint, and determining if the rays intersect a polygon of an object. If there is an intersection, the pixel may be made to display a shading (e.g., color, transparency) based on visual information associated with the polygon that is intersected by the ray. This is repeated for each pixel in what may be described as a "ray-casting" or a "ray-tracing" process, and it may ultimately result in a rendering of an entire view on a screen. This kind of rendering takes time. As an example and not by way of limitation, even with a laptop/desktop, frames may only be rendered in this way at 60 Hz, which means that any changes in perspective that occur within $\frac{1}{60}$th of a second (e.g., from a rapid head movement) would not be captured by what is rendered/displayed.

To address this problem, in particular embodiments, a computing system may generate one or more "surfaces" for a scene to efficiently deal with rendering views quickly, as will be explained further below. Each surface may be a representation of one or more objects within the scene that are expected to move/translate, skew, scale, distort, or otherwise change in appearance together, as one unit, as a result of a change in a user's perspective of the scene (e.g., resulting from a HMD on a user's head moving to a different position and/or orientation). As an example and not by way of limitation, an avatar of a person and a hat worn by the avatar may correspond to one surface if it is determined that person and the hat would move/translate, skew, scale, distort, or otherwise change in appearance together, as one unit. In particular embodiments, a surface may correspond to sets of points (e.g., points making up an object) that are expected to move/translate, skew, scale, distort, or otherwise change in appearance as a single unit when a user's perspective of a scene changes. In particular embodiments, a surface may be a rectangular "texture," which may be a virtual concept that includes visual information (e.g., colors, transparency) defining one or more objects in a scene. The surface may also include a transformation matrix to specify its location in the scene. A surface's texture data may be made up of one or more subparts, referred to herein as "texels." These texels may be blocks (e.g., rectangular blocks) that come together to create a texel array that makes up a surface. As an example and not by way of limitation, they may be contiguous blocks that make up a surface. For illustrative purposes, a texel of a surface may be conceptualized as being analogous to a pixel of an image. A surface may be generated by any suitable device. As an example and not by way of limitation, a CPU or GPU of a wearable or handheld device that generated the initial scene may also generate one or more surfaces for the scene. As another example and not by way of limitation, an onboard computing system of a HMD may generate one or more surfaces after it receives the initial scene from a separate computing system (e.g., from a CPU or GPU of a wearable, handheld, or laptop device). In particular embodiments, there may be a predefined maximum number of surfaces that may be generated for a view (e.g., 16 surfaces) for efficiency purposes.

FIGS. 1A-1I illustrate examples of scenes that include objects that may be represented by surfaces. In particular embodiments, there may be three types of surfaces: image surfaces, label surfaces, and mask surfaces. Image surfaces may be used to render shaded images, for example, video frames, static images, or scenes rendered by a GPU. As an example and not by way of limitation, referencing FIG. 1A, the static image 110 (e.g., a virtual, customized billboard that changes based on the user viewing it) may be represented by an image surface. As another example and not by way of limitation, referencing FIG. 1B, each frame of a dynamic video 120 (e.g., an AR television that is "attached" to a physical object and warped appropriately) may be represented by an image surface. As another example and not by way of limitation, referencing FIG. 1C, several avatars such as the avatar 130 (e.g., a realistic avatar positioned in the scene) may be represented by an image surface. As another example and not by way of limitation, referencing FIG. 1D, the dynamic object 140 (e.g., a dynamic 3D model of a building) shown to multiple viewers concurrently to facilitate collaboration may be represented by an image surface. In particular embodiments, an image surface may store RGB (red-green-blue) components for one or more of its texels. In particular embodiments, an image surface may store RGBA (red-green-blue-alpha) components for one or more of its texels. The alpha component may be a value that specifies a level of transparency that is to be accorded to a texel. As an example and not by way of limitation, an alpha value of 0 may indicate that a texel is fully transparent, an alpha value of 1 may indicate that a texel is opaque, and alpha values in between may indicate a transparency level that is in between (the exact transparency level being determined by the value). An image surface may support any suitable image format. As an example and not by way of limitation, image surfaces may support both 16-bit and 32-bit pixel formats, with 4-bit to 10-bit RGB component sizes. In particular embodiments, each image format may have at least one bit for storing an alpha value (e.g., to allow for transparent regions).

In particular embodiments, label surfaces may store signed distances and color indexes and may be used to render objects that include solid color regions, for example, text, glyphs, and icons. As an example and not by way of limitation, referencing FIG. 1E, the AR book 150 may include text that may be represented by one or more label surfaces. In particular embodiments, surfaces may be fixed to an object (e.g., a static or moving object) in the scene, may be fixed in space, or may be fixed relative to the user's head (e.g., such that it is not fixed to any particular object in the scene, but rather moves along with the user's head). In the example illustrated by FIG. 1E, a text label surface may be fixed relative to the AR book 150 or any other suitable object. As another example and not by way of limitation, referencing FIG. 1F, a periodic table showcasing the elements in a combination of text and multi-colors may be represented by one or more label surfaces. In this example, the periodic table may be displayed relative to the user's head (e.g., such that it is not fixed to any particular object in the scene, but rather moves along with the user's head). As another example and not by way of limitation, referencing FIG. 1G, lines of different colors and associated text related to different bus routes for navigation purposes may be represented by one or more label surfaces, which may be fixed in space or with respect to objects. As another example and not by way of limitation, referencing FIG. 1H, text including augmented information about a bus (e.g., capacity, arrival time, information about the next bus stop) may be represented by one or more label surfaces, which may be fixed with respect to an object (e.g., the bus in FIG. 1H). The label surface may be of any suitable format. As an example and not by way of limitation, label surfaces may store 8 bits per texel including, for example, a 6-bit distance field value and a 2-bit index. As another example and not by way of limitation, dual label surfaces may store 16 bits per label texel (e.g., a first 6-bit distance field and a first 2-bit index, and a second 6-bit distance field and a second 2-bit index) to allow for specifying two signed distance functions. In particular embodiments, the indexes in these examples may be used to look up an RGBA color to use, depending on the high-order bit of the interpolated distance.

In particular embodiments, mask surfaces may store an alpha value (e.g., a value of 1) that may be used to occlude surfaces that are behind it. As an example and not by way of limitation, referencing FIG. 1I, a mask surface may occlude a portion of the surface representing the AR object 160 as the (real-world) hand 170 of a user passes in front of the AR object 160.

Figure 2:
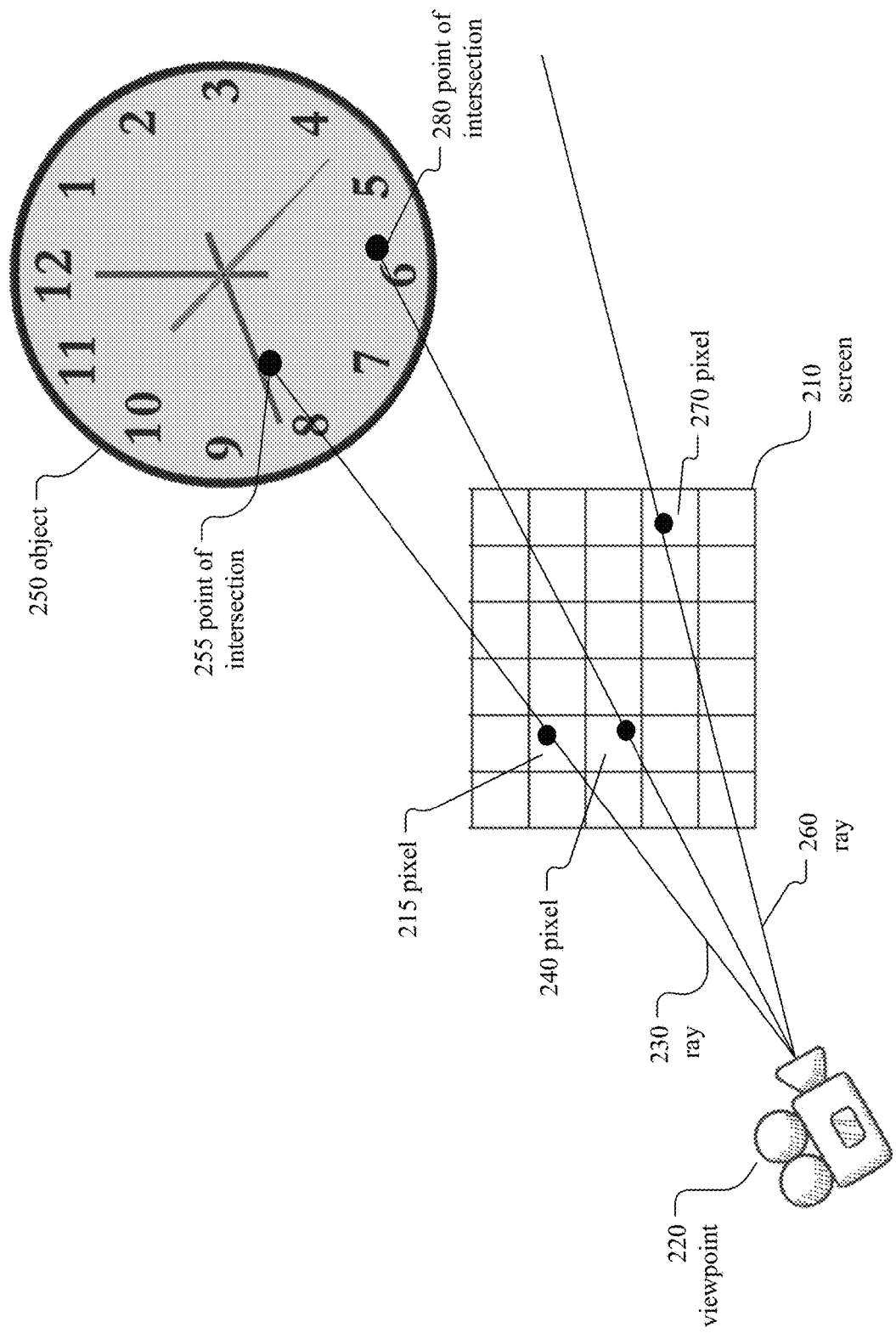
FIG. 2 illustrates a first "ray-casting" process for determining visual information and location information of objects that are to be displayed within a view of a scene.

FIG. 2 illustrates a first "ray-casting" process for determining visual information and location information of objects that are to be displayed within a view of a scene. While ray casting is used in this example, other rendering techniques may also be used, such as ray tracing. In particular embodiments, the first computing system (e.g., a laptop, a cellphone, a desktop, a wearable device) may perform this first ray-casting process to render a view of a scene. A "view" of a scene may refer to a user perspective of the scene, which may, for example, be determined based on a current position and orientation of an HMD. To understand how an object is displayed within a view, it is helpful to imagine a number of imaginary rays emanating from a viewpoint (e.g., a "virtual camera" that may represent the viewpoint of a user viewing the scene on a HMD) to pixels on a screen (e.g., corresponding to a display on a HMD for a single eye). As an example and not by way of limitation, referencing FIG. 2, the imaginary ray 230 may emanate from the viewpoint 220 and intersect with the pixel 215 of the screen 210 (e.g., which may correspond to the display of one of two eyepieces of a HMD). As another example and not by way of limitation, the imaginary ray 260 may intersect with the pixel 270. The imaginary ray may be cast repeatedly, using what may be referred to herein as a "ray-casting process," for all (or at least a subset) of the pixels of a screen to determine what each pixel should display (e.g., the color and transparency of the pixel). In particular embodiments, this first ray-casting process illustrated in FIG. 2 may be performed by a computing system (e.g., a wearable device, a handheld device, a laptop) that is separate from the HMD that will ultimately display a view to a user. The computing system may perform the ray-casting process and determine whether or not each of the imaginary rays intersects with an object (e.g., defined by a 3D model made up of polygons), and may further determine where on the object the imaginary ray intersects (if it does). As an example and not by way of limitation, the imaginary ray 230 may intersect with the object 250 (e.g., an AR clock) at the point of intersection 255. In this example, the computing system may determine that pixel 215 is associated with the point of intersection 255, because the ray 230 also intersects the screen 210 at the pixel 215. As another example and not by way of limitation, the imaginary ray 260 (following a course correction to account for distortion/aberration) may not intersect with the object 250. In this example, the computing system may determine that pixel 215 should not be associated with the object 250. This use of the ray-casting process may be referred to herein as a "visibility test," because it may be used to determine the object (or portions thereof) that are visible within a given view. The ray-casting process may ultimately be used to associate pixels of the screen with points of intersection on any objects that would be visible for a view of a scene.

Figure 3:
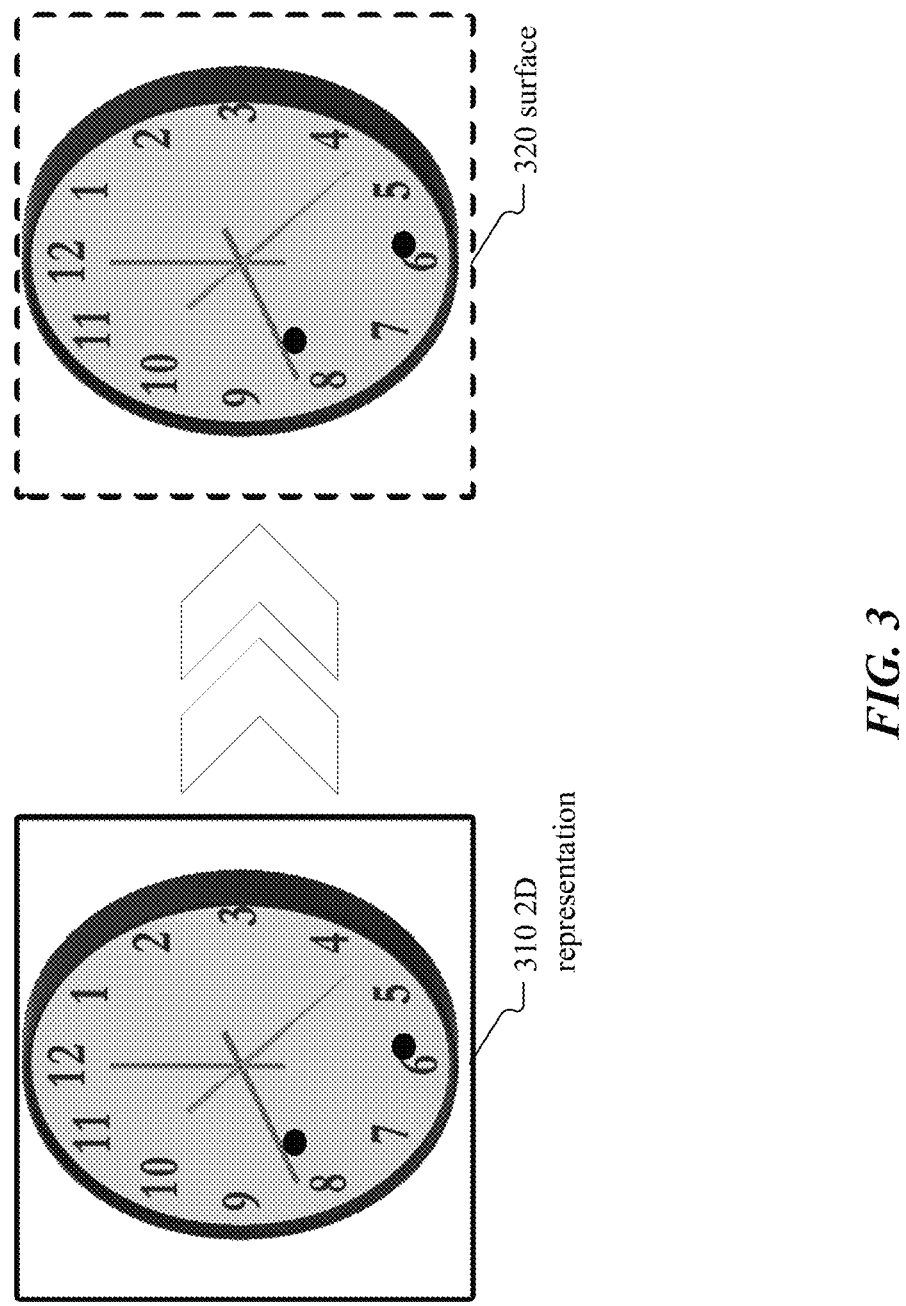
FIG. 3 illustrates the concept of converting a 2D representation of an object to a surface.

FIG. 3 illustrates the concept of converting a 2D representation of an object (e.g., the object 250) to a surface. In particular embodiments, the first ray-casting process may be used to generate a 2D representation of an object that is to be displayed within a view of a scene. The view may be determined, for example, based on a current position and orientation of a HMD mounted on a user's head. The 2D representation of the object may represent the object as it should appear within the view, and as such, may account for the user's perspective of the object from the view. As an example and not by way of limitation, referencing FIGS. 2 and 3, the 2D representation 310 may reflect the view of the object 250 from a perspective of a user standing to the left of the object 250 (e.g., causing the viewpoint 220 to be on the left of the object 250). In this example, to determine what the object 250 looks like from this perspective, a first ray-casting process may be performed from the viewpoint 220. The result of this first ray-casting process may produce a skewed image (e.g., as shown in the 2D representation 310) as a result of how imaginary rays from the ray-casting process would intersect the object 250 in the first ray-casting process, reflecting how the object 250 would look from the viewpoint 220. In particular embodiments, as discussed elsewhere herein, a computing system (e.g., a computing system separate from the HMD, an onboard computing system of the HMD, or any other suitable computing system) may convert the 2D representation into a surface. As an example and not by way of limitation, referencing FIG. 3, the 2D representation 310 may be converted into the surface 320, which may be an image surface that encodes for visual information (RGBA) (e.g., as a texture) and location information that describes the location of the surface within a 3D space of a scene (e.g., specified in the viewer's view coordinates).

Figure 4:
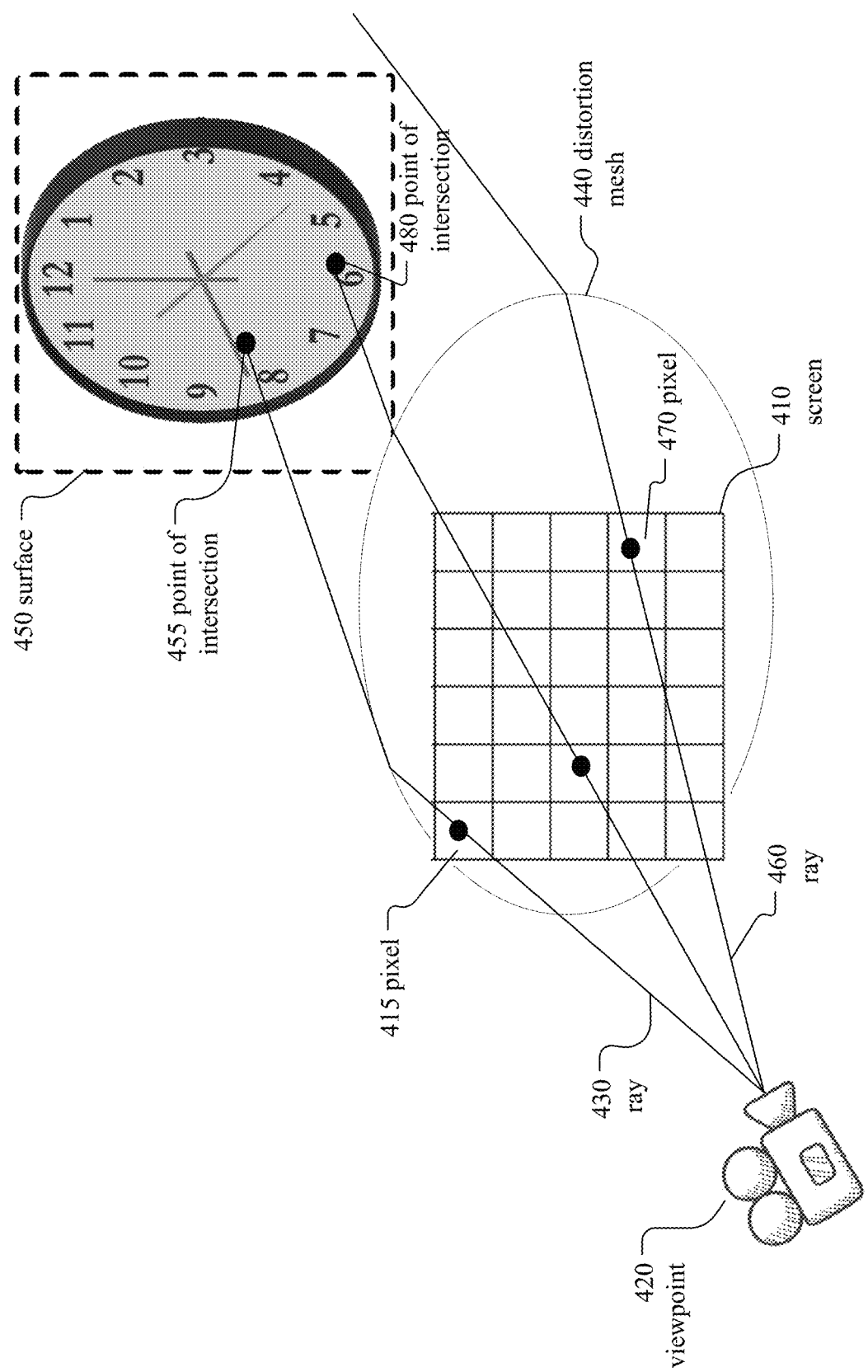
FIG. 4 illustrates an example conceptualization of a second ray-casting process for rendering an object for display from a viewpoint of a scene based on information associated with a corresponding surface.

FIG. 4 illustrates an example conceptualization of a second ray-casting process for post-warping or re-sampling a surface for display from a viewpoint of a scene. In particular embodiments, an onboard computing system of the HMD (or some other suitable second computing system) may determine how a surface should be displayed based on information associated with the surface. In particular embodiments, one or more surfaces may include location information that places them at specified locations within a 3D space associated with the scene. As an example and not by way of limitation, referencing FIG. 4, the surface 450 may be placed at its illustrated location based on associated location information. In this example, although the surface may appear to depict a 3D clock with varying depths relative to the viewer (e.g., the 9 o'clock region may appear farther away from the viewer than the 3 o'clock region), the surface, in particular embodiments, may be a flat surface that is facing the viewer (e.g., its normal vector points towards the viewer, at least initially before the viewpoint changes). Any visual representations of an object(s) may be stored as part of the surface's texture data.

In particular embodiments, each texel of a surface may have associated location information that specifies where it is to be located. In particular embodiments, similar to the first ray-casting process, a second ray-casting process may be performed by the computing system of the HMD to render a view. This second ray-casting process may be used to perform visibility tests to determine what surfaces are visible within the view, and where the surfaces are located in the view. As an example and not by way of limitation, referencing FIG. 4, the imaginary ray 430 may emanate from the viewpoint 420 and intersect with the pixel 415 of the screen 410 (e.g., the display of one of two eyepieces of a HMD). As another example and not by way of limitation, the imaginary ray 460 may intersect with the pixel 470. In particular embodiments, the computing system of the HMD may account for distortion and/or other aberrations (e.g., chromatic aberrations) introduced by the optical structures of the HMD (e.g., the lenses of a HMD). The distortions/aberrations may be corrected for mathematically. This correction may be conceptually represented as a process whereby imaginary rays travel through a distortion mesh 440 that mathematically course-corrects the imaginary rays (e.g., the imaginary ray 430, the imaginary ray 460) to account for distortions/aberrations, as shown in FIG. 4. Based on the location information of the surface 450, the computing system may determine whether or not each of the imaginary rays intersects with the surface 450 (or any other surface), and may determine where on the surface 450 the imaginary ray intersects (if it does). As an example and not by way of limitation, the imaginary ray 430 (following a course correction to account for distortion/aberration) may intersect with the surface 450 at the point of intersection 455. As another example and not by way of limitation, the imaginary ray 460 (following a course correction to account for distortion/aberration) may not intersect with the surface 450 or any other surface.

For illustrative purposes, an example use case will now be described using the clock example illustrated in FIGS. 2-5. The first ray casting/tracing process in FIG. 2 may render an image of a clock for a first perspective with a particular time (e.g., the time 12:42:22). This may be the time when a frame is generated by a laptop, or another suitable first computing system, such as a wearable device on the body that is separate from the HMD. From that time until the next frame is generated by the laptop (which may be generated, for illustrative purposes, at 1 frame per second), the user's perspective may change to a second perspective. To account for the change, the scene may need to be adjusted. However, the first body system may not be able to render another scene that quickly enough (e.g., at ½00th of a second). Thus, rather than rendering the whole scene from scratch, the HMD may be tasked with warping the surface (e.g., the surface 320 in FIG. 3) corresponding to the clock image generated by the laptop (still showing 12:42:22) based on the latest viewpoint information as determined by the latest position and orientation of the HMD (e.g., as may be determined based on the inertial measuring unit of the HMD), and optionally, the user's gaze (e.g., as determined by eye tracking). This is illustrated by the ray-casting and sampling process shown in FIGS. 4-5. The HMD may generate several subframes in this manner until the next frame is generated by the laptop (e.g., with a clock that shows the time 12:42:23, if it is rendering at 1 frame per second).

In particular embodiments, the first and/or second ray-casting process may be performed separately for each eye of a user to account for slight changes in the viewpoint (e.g., based on the relative positions of the eyes). As an example and not by way of limitation, the first and second ray-casting processes may be performed for a screen associated with the left eye and for a screen associated with the right eye. These processes may run independently of each other and may even function out of sync with one another.

Figure 5:
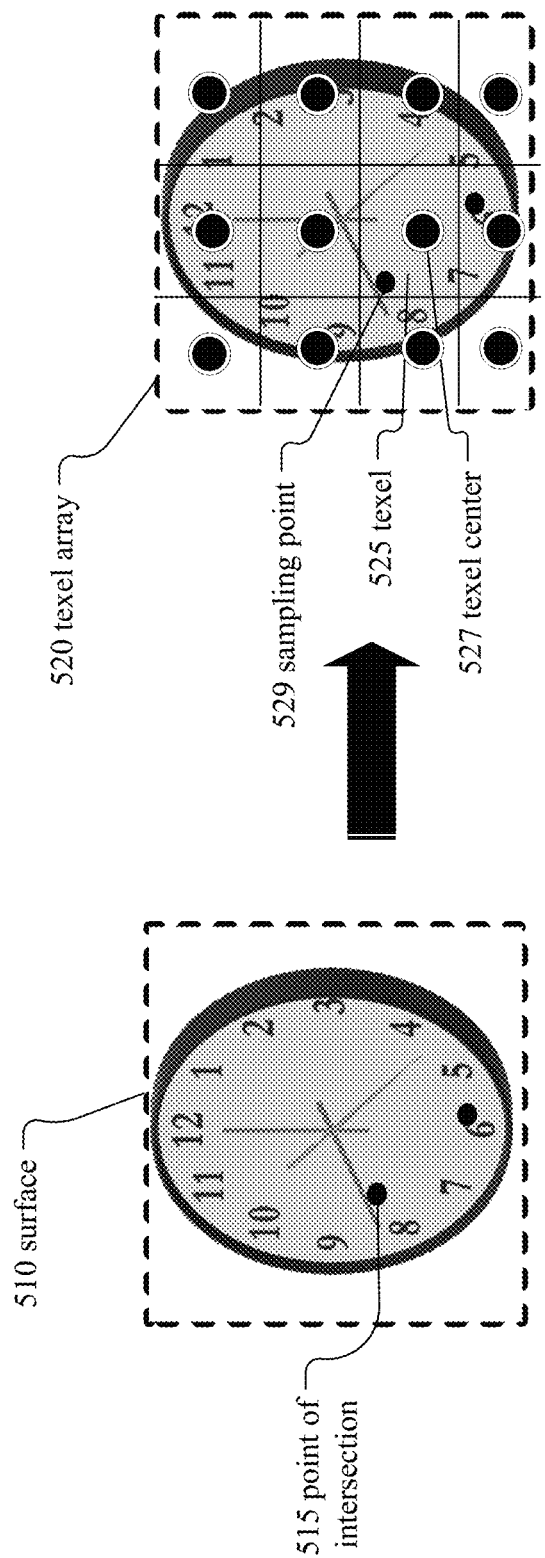
FIG. 5 illustrates a conceptualization of identifying visual information that correspond to points of intersection.

FIG. 5 illustrates a conceptualization of identifying visual information that correspond to points of intersection. In particular embodiments, the computing system of the HMD may display, on a screen (e.g., a screen for a single eye), a warped surface depicting an object (e.g., a clock) based on visual information associated with the surface. In particular embodiments, the computing system of the HMD may determine visual information (e.g., RGBA information) associated with points of intersection by determining the location of the points of intersection on a corresponding texel array. As an example and not by way of limitation, referencing FIG. 5, the surface 510 (e.g., which may be the surface 450 in FIG. 4) may correspond to the texel array 520, which includes texel information (e.g., RGBA information) for the surface 510. In this example, the texel array may be entirely in 2D space, without any of the 3D location information of the surface 510, which may be particularly beneficial in that it may greatly simplify the mathematics required to determine the visual information of a point of intersection of an imaginary ray associated with a pixel. Consequently, the computational tasks involved in the determination may require fewer resources and may be done more quickly and efficiently. As an example and not by way of limitation, the point of intersection 515, which may be represented by a three-dimensional (x, y, z)-coordinate in the 3D view space in which the surface 510 is placed, may be transformed into a two-dimensional (u, v)-coordinate in the texel array 520. In this example, it may be determined that the point of intersection 515 in the surface 510 corresponds to the pixel sampling point 529 in the texel array 520. A computing system (e.g., an onboard computing system of a HMD) may determine visual information for the points of intersection based on information associated with the corresponding texel array. As an example and not by way of limitation, RGBA information for the point of intersection 515 may be determined based on RGBA information associated with the corresponding sampling point 529 in the texel array 520.

In particular embodiments, the surface may only have information for a discrete number of points within each texel (e.g., the single texel center 527 for the texel 525). In such cases, the computing system of the HMD may perform one or more interpolations (e.g., a bilinear or a trilinear interpolation) or any other suitable calculations to determine a visual information (e.g., RGBA information) associated with a particular sampling point. As an example and not by way of limitation, the computing system may perform a bilinear interpolation for the sampling point 529 using RGBA information associated with the texel center 527 and other neighboring texel centers (e.g., the other three texel centers surrounding the sampling point 529) to determine RGBA information for the sampling point 529. The HMD may display, within the corresponding pixel, a color and transparency level that may match the determined RGBA information. As an example and not by way of limitation, referencing FIGS. 4 and 5, the sampling point 529 may correspond to the pixel 415, in which case, the RGBA information determined for the sampling point 529 may be used to determine color and transparency level to be displayed within the pixel 415. Building on this example and not by way of limitation, rays may be cast for all the pixels of the screen 410 and display visual information for any other points where the rays intersect a surface (e.g., the point of intersection 480 intersecting the surface 450, a point of intersection of the imaginary ray 460 that may be associated with a different surface).

In particular embodiments, the computing system of the HMD may continuously or semi-continuously track the position and orientation of the HMD (e.g., using inertial, optical, depth, and/or other sensors on the HMD or on a remote device tracking the HMD) to determine the perspective of the user wearing the HMD at any given time. In particular embodiments, the computing system may also continuously or semi-continuously track the eye position of the user (e.g., to adjust for distortions resulting from lenses of the HMD that may be dependent on the user's gaze). Unfortunately, since rendering graphics is computationally expensive and takes time, new frames cannot be generated instantaneously. If there is a significant latency in updating the display to reflect a change in perspective, the user may be able to perceive the latency, creating a sensory dissonance. As further explained elsewhere herein, this sensory dissonance may contribute to unpleasant effects for the user, such as virtual reality sickness or may otherwise interrupt the user experience. To prevent this dissonance, what is displayed to the user may need to account for changes in perspective at a very rapid rate. As an example and not by way of limitation, the view of a scene may need to be modified every $\frac{1}{200}$th of a second (e.g., because any latency beyond that may be perceptible to a user to an unacceptable degree). In many cases, it may be impractical or unfeasible for a computing system to re-render entire views (e.g., from polygons) to account for changes in perspective at such a rapid pace. As such, inventive shortcuts may be required to quickly approximate changes to the view.

In particular embodiments, one such shortcut for approximating changes to a view may involve "resampling" surfaces within a view (rather than re-rendering the entire view). In particular embodiments, resampling may involve performing a further ray-casting process to determine an approximation of how surfaces may look from an adjusted perspective. By focusing on just resampling a limited number of surfaces within a view (e.g., 16 surfaces), the view can be modified quickly—and sufficiently quickly to prevent or reduce user perception of latency. As an example and not by way of limitation, further second ray-casting processes may be performed every $\frac{1}{200}$th of a second, to account for possible changes in perspective (e.g., from a change in position or orientation of the HMD). In particular embodiments, an onboard computing system of a HMD may resample one or more of the surfaces by performing a ray-casting process as outlined above with respect to FIG. 4, but this time with the viewpoint 420 being adjusted (e.g., moved to a different position and/or orientation) to reflect the latest perspective of the user. If the perspective has changed since the previous ray-casting process, the imaginary rays may accordingly intersect with different points of the surface. As an example and not by way of limitation, referencing FIG. 4, if the view point 420 were shifted slightly to the right (as a result of a slight head movement), the point of intersection 455 of the ray 430 may correspondingly shift to the left. Modifying the view based on resampling in this manner may only be an approximation of how the view is supposed to be altered by a change in perspective, and this approximation may only work for relatively small changes in perspective. But this may be all that is needed, because the purpose is to account for changes that happen in relatively short periods of time between when fully rendered frames are generated by the user's laptop or mobile phone (e.g., on the order of a hundredth of a second). Essentially, it may be a temporary fix until a view can be re-rendered (e.g., by a more powerful computing system such as a wearable device). As an example and not by way of limitation, a more powerful computing system that may be separate from the HMD (e.g., a wearable device secured to the user's belt or waistline) may re-render the view from scratch every 1/60th of a second and may send these re-rendered views to the HMD device as they are rendered. In this example, the HMD device, in the time between receiving re-rendered views every 1/60th of a second, may on its own modify surfaces (e.g., every 1/200th of a second) to account for rapid changes in user perspective.

In particular embodiments, changes in lighting conditions may be ignored in the resampling process to increase the efficiency and speed of modification. Lighting changes are at most negligible at the short time periods contemplated by the resampling process, and they may be safely ignored. This may be especially true in the context of AR, where there is already real-world lighting and where the lighting may not change much from the relatively small changes in perspective that are contemplated (e.g., changes that occur during a short time period on the order of a hundredth of a second).

Although this disclosure focuses on AR objects in an AR environment, it contemplates rendering VR objects in a VR environment too. As an example and not by way of limitation, in the case of VR, a first computing system (e.g., a wearable device, a handheld device, a laptop) may render an entire VR initial scene for display to a user. Surfaces may be generated by the first computing system for VR objects within the scene. The initial scene and the surfaces may be sent to a VR HMD, which may include a separate computing system that is able to modify the surfaces in response to detected changes in perspective (e.g., detected based on position and orientation of the HMD as further explained elsewhere herein). In an alternative embodiment, the VR HMD may simply receive the initial scene and may on its own generate surfaces for the scene that it then modifies.

Figure 6A:
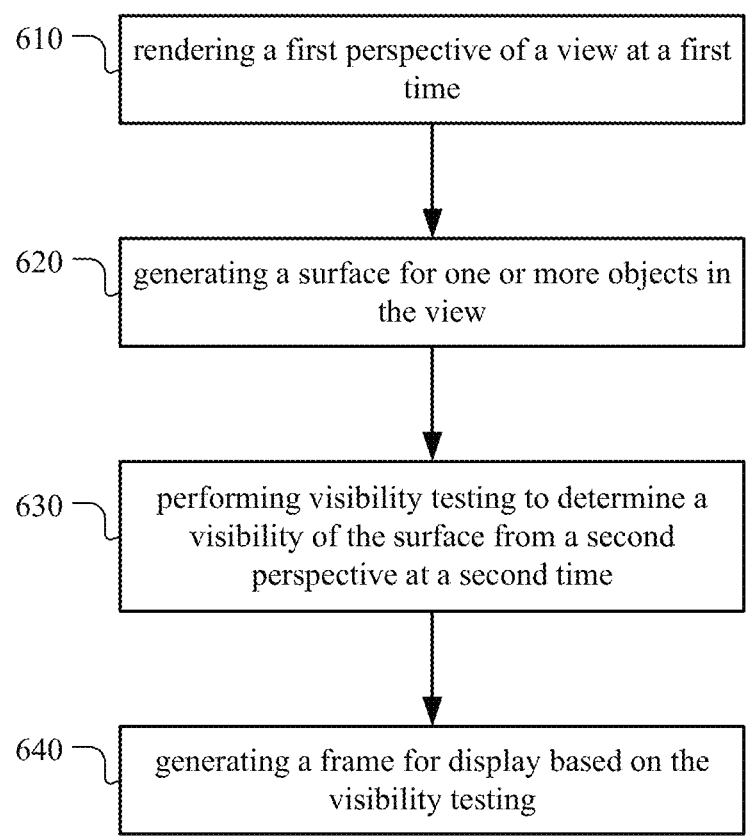
FIGS. 6A and 6B illustrate example methods for generating subframes based on surfaces.

FIG. 6A illustrates an example method 600 for generating frames based on surfaces. The method may begin at step 610, where a first perspective of a view is rendered at a first time. At step 620, a surface is generated for one or more objects in the view. At step 630, visibility testing is performed to determine a visibility of the surface from a second perspective at a second time. At step 640, a frame is generated for display based on the visibility testing. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating frames based on surfaces, including the particular steps of the method of FIG. 6, this disclosure contemplates any suitable method for generating frames based on surfaces, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 6B:
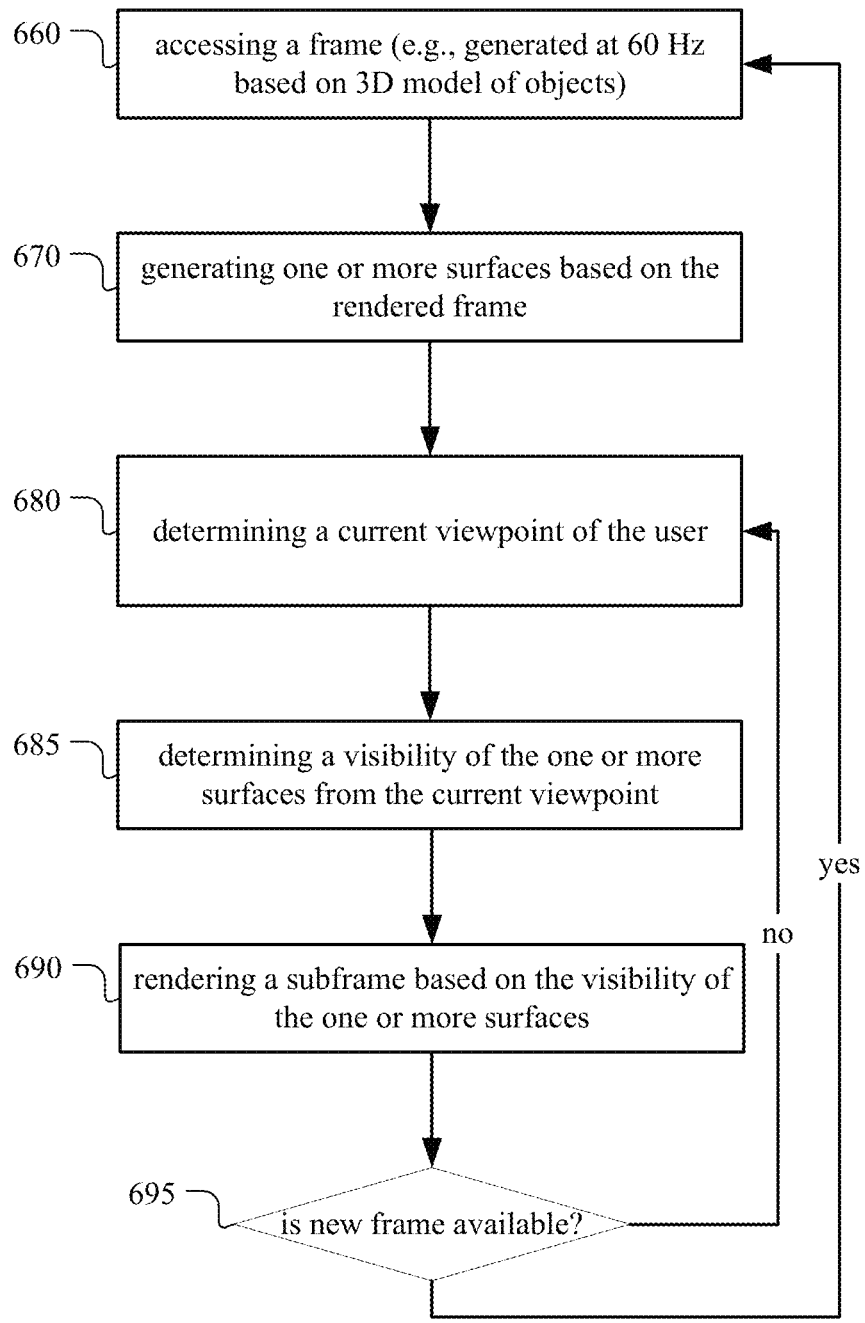

FIG. 6B illustrates an example method 650 for generating subframes based on surfaces. The method may begin at step 660, where one or more computing systems may access a rendered frame depicting a virtual scene from a first viewpoint of a user. The rendered frame may be generated based on at least one 3D model of an object in the virtual scene. At step 670, the one or more computing systems may generate one or more surfaces based on the rendered frame. Each surface may be positioned within a 3D space and comprises visual information. At step 680, the one or more computing systems may determine a second, current viewpoint of the user in the 3D space. At step 685, the one or more computing systems may determine a visibility of the one or more surfaces from the second viewpoint. At step 690, the one or more computing systems may render a subframe depicting the virtual scene from the second viewpoint based on the visual information and determined visibility of the one or more surfaces. As illustrated by step 690, the subframe generating process based on the one or more surfaces may repeat (represented by the arrow returning to step 680) until a new frame is available (represented by the arrow returning to step 660).

Figure 7:
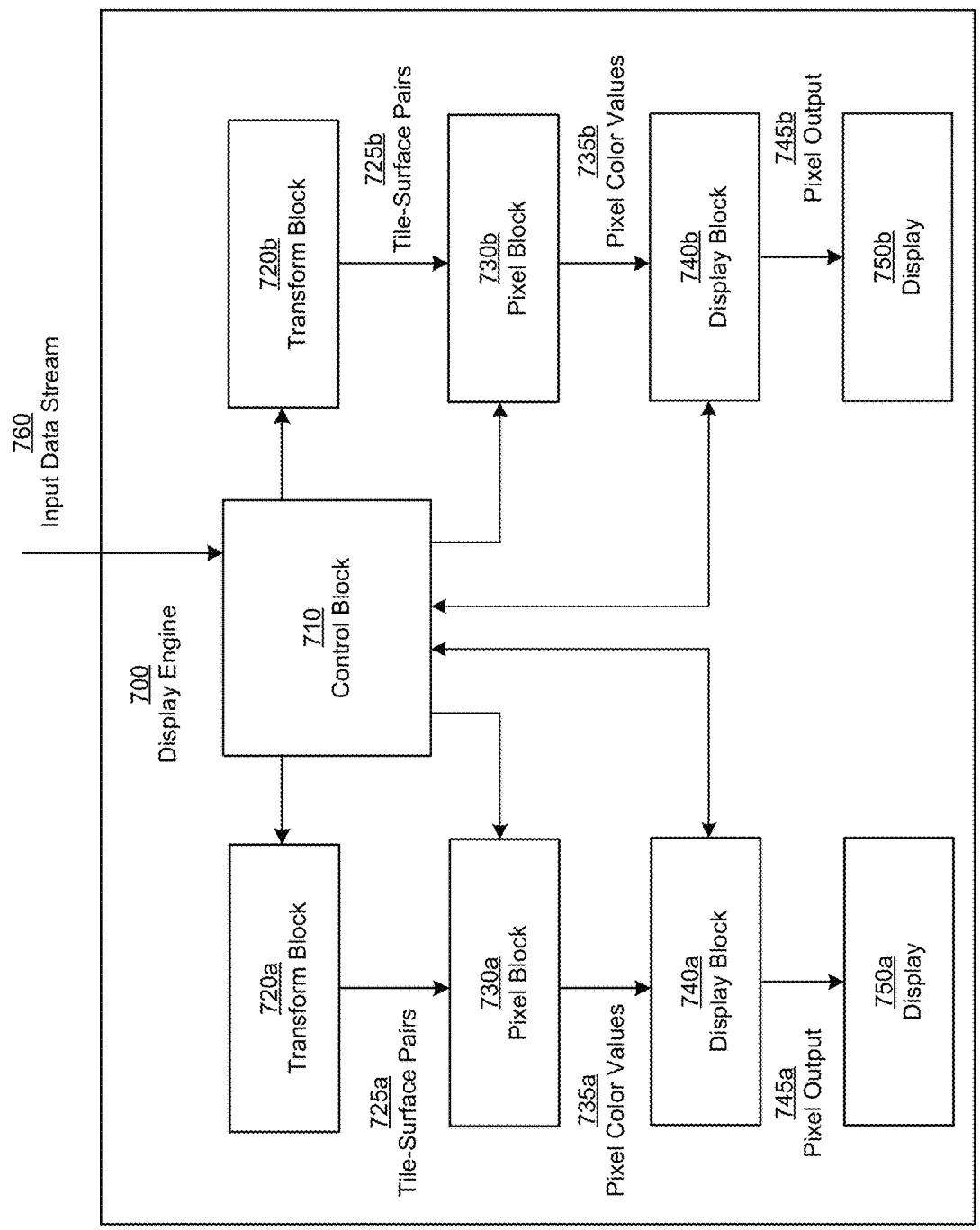
FIG. 7 illustrates an example high-level architecture for a display engine.

FIG. 7 illustrates a system diagram for a display engine 700. The display engine 700 may comprise four types of top level blocks. As shown in FIG. 7, these blocks may include a control block 710, transform blocks 720a and 720b, pixel blocks 730a and 730b, and display blocks 740a and 740b. One or more of the components of the display engine 700 may be configured to communicate via one or more high-speed bus, shared memory, or any other suitable method. As shown in FIG. 7, the control block 710 of display engine 700 may be configured to communicate with the transform blocks 720a and 720b and pixel blocks 730a and 730b. Display blocks 740a and 740b may be configured to communicate with the control block 710. As explained in further detail herein, this communication may include data as well as control signals, interrupts and other instructions.

In particular embodiments, the control block 710 may receive an input data stream 760 from a primary rendering component and initialize a pipeline in the display engine 700 to finalize the rendering for display. In particular embodiments, the input data stream 760 may comprise data and control packets from the primary rendering component. The data and control packets may include information such as one or more surfaces comprising texture data and position data and additional rendering instructions. The control block 710 may distribute data as needed to one or more other blocks of the display engine 700. The control block 710 may initiate pipeline processing for one or more frames to be displayed. In particular embodiments, a HMD may comprise multiple display engines 700 and each may comprise its own control block 710.

In particular embodiments, transform blocks 720a and 720b may determine initial visibility information for surfaces to be displayed in the artificial reality scene. In general, transform blocks (e.g., the transform blocks 720a and 720b) may cast rays from pixel locations on the screen and produce filter commands (e.g., filtering based on bilinear or other types of interpolation techniques) to send to pixel blocks 730a and 730b. Transform blocks 720a and 720b may perform ray casting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the respective pixel blocks (730a and 730b).

In general, transform blocks 720a and 720b may each comprise a four-stage pipeline, in accordance with particular embodiments. The stages of a transform block may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the displays 750a and 750b of the HMD. Transform blocks 720a and 720b may determine whether each ray bundle intersects with surfaces in the scene by comparing a bounding box of each tile to bounding boxes for each surface. If a ray bundle does not intersect with an object, it may be discarded. Tile-surface intersections are detected, and corresponding tile-surface pair 725a and 725b are passed to pixel blocks 730a and 730b.

In general, pixel blocks 730a and 730b determine color values from the tile-surface pairs 725a and 725b to produce pixel color values, in accordance with particular embodiments. The color values for each pixel are sampled from the texture data of surfaces received and stored by the control block 710 (e.g., as part of input data stream 760). Pixel blocks 730a and 730b receive tile-surface pairs 725a and 725b from transform blocks 720a and 720b, respectively, and schedule bilinear filtering. For each tile-surface pair 725a and 725b, pixel blocks 730a and 730b may sample color information for the pixels within the tile using color values corresponding to where the projected tile intersects the surface. In particular embodiments, pixel blocks 730a and 730b may process the red, green, and blue color components separately for each pixel. Pixel blocks 730a and 730b may then output pixel color values 735a and 735b, respectively, to display blocks 740a and 740b.

In general, display blocks 740a and 740b may receive pixel color values 735a and 735b from pixel blocks 730a and 730b, converts the format of the data to be more suitable for the scanline output of the display, apply one or more brightness corrections to the pixel color values 735a and 735b, and prepare the pixel color values 735a and 735b for output to the displays 750a and 750b. Display blocks 740a and 740b may convert tile-order pixel color values 735a and 735b generated by pixel blocks 730a and 730b into scanline- or row-order data, which may be required by the displays 750a and 750b. The brightness corrections may include any required brightness correction, gamma mapping, and dithering. Display blocks 740a and 740b may provide pixel output 745a and 745b, such as the corrected pixel color values, directly to displays 750a and 750b or may provide the pixel output 745a and 745b to a block external to the display engine 700 in a variety of formats. For example, the HMD may comprise additional hardware or software to further customize backend color processing, to support a wider interface to the display, or to optimize display speed or fidelity.

Figure 8:
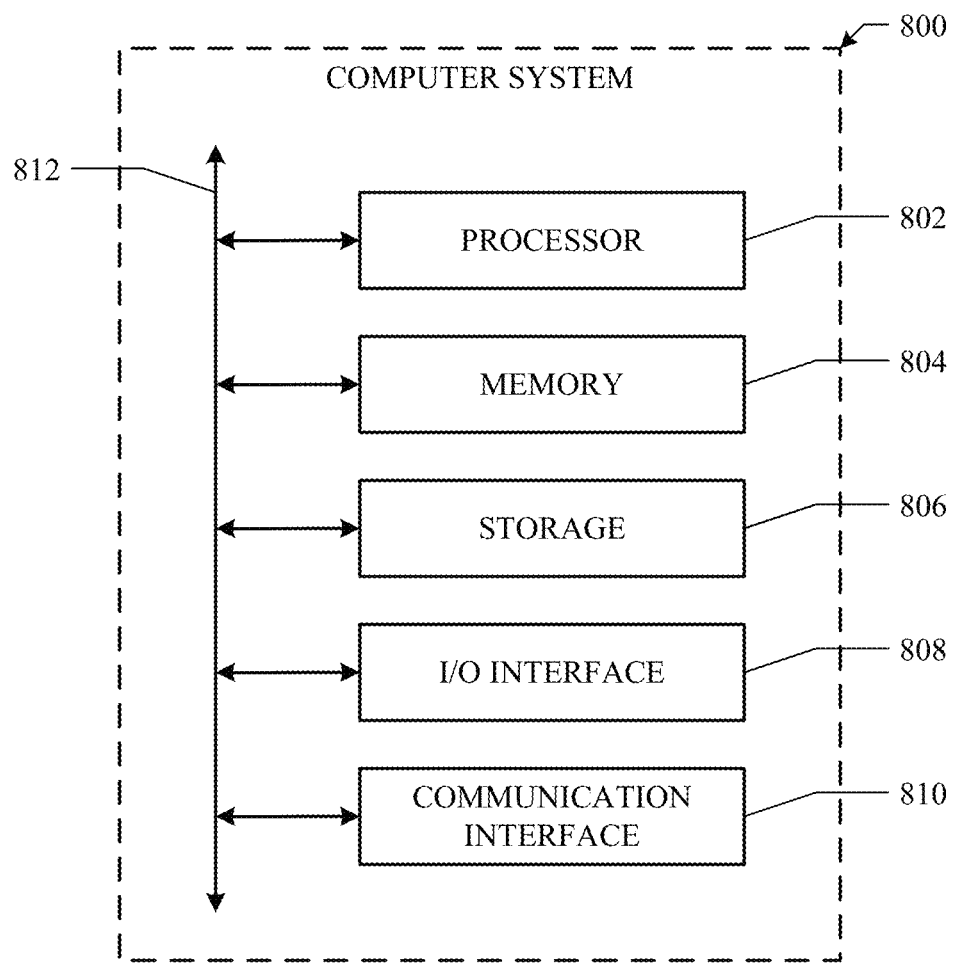
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    rendering, for a first frame of a virtual scene, a plurality of images each depicting a different one of a plurality of virtual objects in a 3D space as seen from a first viewpoint of a user at a first time, wherein each image of a virtual object is generated based on a respective 3D model of the virtual object, and wherein each respective 3D model is represented as a plurality of polygons;
    generating a plurality of surfaces using the plurality of images, wherein:
        each surface (1) represents a respective virtual object of the plurality of virtual objects and (2) comprises visual information about the respective virtual object as viewed from the first viewpoint,
        each surface is a planar polygon corresponding to the respective virtual object and positioned within the 3D space, and
        each surface is represented by a lower number of polygons than a number of the plurality of polygons in the 3D model of the respective virtual object;
    determining a second viewpoint of the user at a second time in the 3D space, the second viewpoint being different from the first viewpoint and the second time being subsequent to the first time;
    determining a visibility of the plurality of surfaces from the second viewpoint by casting rays from the second viewpoint toward the plurality of surfaces; and
    rendering a plurality of output images for a subframe depicting the virtual scene and the plurality of virtual objects from the second viewpoint based on the visual information and the determined visibility of the plurality of surfaces, wherein each output image represents a respective virtual object and is rendered based on the corresponding surface of the respective virtual object.

2. The method of claim 1, wherein:
    the visual information of each of the plurality of surfaces is a texture;
    the determined visibility of the plurality of surfaces identifies points on the plurality of surfaces visible from the second viewpoint; and
    the rendering of the subframe comprises sampling the texture of each of the plurality of surfaces according to the points on the plurality of surfaces.

3. The method of claim 1, wherein:
    the rendered first frame is generated based on computed intersections between one or more of the plurality of polygons and of the respective 3D model of each virtual object rays cast from the first viewpoint.

4. The method of claim 1, wherein:
    the rendered first frame is one of a plurality of frames generated based on at least the respective 3D model of each virtual object;
    the rendered subframe is one of a plurality of subframes generated based on the plurality of surfaces; and
    the plurality of subframes are generated after the rendered first frame and before a subsequent one of the plurality of frames.

5. The method of claim 4, wherein:
    the plurality of frames are generated at a first frame rate; and
    the plurality of subframes are generated at a second frame rate that is higher than the first frame rate.

6. The method of claim 1, wherein the rendered first frame is generated using ray tracing.

7. The method of claim 1, wherein the first viewpoint and the second viewpoint are determined at different times.

8. The method of claim 1, wherein:
    the rendered first frame is generated based on a first 3D model of a first virtual object and a second 3D model of a second virtual object in the virtual scene; and
    at least one of the plurality of surfaces comprises visual information that depict both the first virtual object and the second virtual object.

9. The method of claim 1, wherein each of the plurality of surfaces is flat.

10. The method of claim 1, wherein the rendered first frame and the subframe are different.

11. The method of claim 1, wherein the rendered first frame and the rendered subframe are rendered by different computing systems.

12. One or more computer-readable non-transitory storage media embodying software that is operable when executed to:
render, for a first frame of a virtual scene, a plurality of images each depicting a different one of a plurality of virtual objects in a 3D space as seen from a first viewpoint of a user at a first time, wherein each image of a virtual object is generated based on a respective 3D model of the virtual object, and wherein each respective 3D model is represented as a plurality of polygons;
generate a plurality of surfaces using the plurality of images, wherein:
 each surface (1) represents a respective virtual object of the plurality of virtual objects and (2) comprises visual information about the respective virtual object as viewed from the first viewpoint,
 each surface is a planar polygon corresponding to the respective virtual object and positioned within the 3D space, and
 each surface is represented by a lower number of polygons than a number of the plurality of polygons in the 3D model of the respective virtual object;
determine a second viewpoint of the user at a second time in the 3D space, the second viewpoint being different from the first viewpoint and the second time being subsequent to the first time;
determine a visibility of the plurality of surfaces from the second viewpoint by casting rays from the second viewpoint toward the plurality of surfaces; and
render a plurality of output images for a subframe depicting the virtual scene and the plurality of virtual objects from the second viewpoint based on the visual information and the determined visibility of the plurality of surfaces, wherein each output image represents a respective virtual object and is rendered based on the corresponding surface of the respective virtual object.

13. The media of claim 12, wherein:
the visual information of each of the plurality of surfaces is a texture;
the determined visibility of the plurality of surfaces identifies points on the plurality of surfaces visible from the second viewpoint; and
the rendering of the subframe comprises sampling the texture of each of the plurality of surfaces according to the points on the plurality of surfaces.

14. The media of claim 12, wherein:
the rendered first frame is generated based on computed intersections between one or more of the plurality of polygons of the respective 3D model of each virtual object and rays cast from the first viewpoint.

15. The media of claim 12, wherein:
the rendered first frame is one of a plurality of frames generated based on at least the respective 3D model of each virtual object;
the rendered subframe is one of a plurality of subframes generated based on the plurality of surfaces; and
the plurality of subframes are generated after the rendered first frame and before a subsequent one of the plurality of frames.

16. A system comprising:
one or more processors; and
one or more computer-readable non-transitory storage media coupled to one or more of the processors and comprising instructions operable when executed by one or more of the processors to cause the system to:
render, for a first frame of a virtual scene, a plurality of images each depicting a different one of a plurality of virtual objects in a 3D space as seen from a first viewpoint of a user at a first time, wherein each image of a virtual object is generated based on a respective 3D model of the virtual object, and wherein each respective 3D model is represented as a plurality of polygons;
generate a plurality of surfaces using the plurality of images, wherein:
 each surface (1) represents a respective virtual object of the plurality of virtual objects and (2) comprises visual information about the respective virtual object as viewed from the first viewpoint,
 each surface is a planar polygon corresponding to the respective virtual object and positioned within the 3D space, and
 each surface is represented by a lower number of polygons than a number of the plurality of polygons in the 3D model of the respective virtual object;
determine a second viewpoint of the user at a second time in the 3D space, the second viewpoint being different from the first viewpoint and the second time being subsequent to the first time;
determine a visibility of the plurality of surfaces from the second viewpoint by casting rays from the second viewpoint toward the plurality of surfaces; and
render a plurality of output images for a subframe depicting the virtual scene and the plurality of virtual objects from the second viewpoint based on the visual information and the determined visibility of the plurality of surfaces, wherein each output image represents a respective virtual object and is rendered based on the corresponding surface of the respective virtual object.

17. The system of claim 16, wherein:
the visual information of each of the plurality of surfaces is a texture;
the determined visibility of the plurality of surfaces identifies points on the plurality of surfaces visible from the second viewpoint; and
the rendering of the subframe comprises sampling the texture of each of the plurality of surfaces according to the points on the plurality of surfaces.

18. The system of claim 16, wherein:
the rendered first frame is generated based on computed intersections between one or more of the plurality of polygons of the respective 3D model of each virtual object and rays cast from the first viewpoint.

19. The system of claim 16, wherein:
the rendered first frame is one of a plurality of frames generated based on at least the respective 3D model of each virtual object;
the rendered subframe is one of a plurality of subframes generated based on the plurality of surfaces; and
the plurality of subframes are generated after the rendered first frame and before a subsequent one of the plurality of frames.

* * * * *